DISPLACEMENT MOLDING PLASTIC ARTICLES

Original Filed May 15, 1970 6 Sheets-Sheet 1

DISPLACEMENT MOLDING PLASTIC ARTICLES

Original Filed May 15, 1970 6 Sheets-Sheet 2

DISPLACEMENT MOLDING PLASTIC ARTICLES

Original Filed May 15, 1970 6 Sheets-Sheet 3

DISPLACEMENT MOLDING PLASTIC ARTICLES

Original Filed May 15, 1970 6 Sheets-Sheet 4

DISPLACEMENT MOLDING PLASTIC ARTICLES

Original Filed May 15, 1970 6 Sheets-Sheet 5

DISPLACEMENT MOLDING PLASTIC ARTICLES
Original Filed May 15, 1970 6 Sheets-Sheet 6
FIG. 14
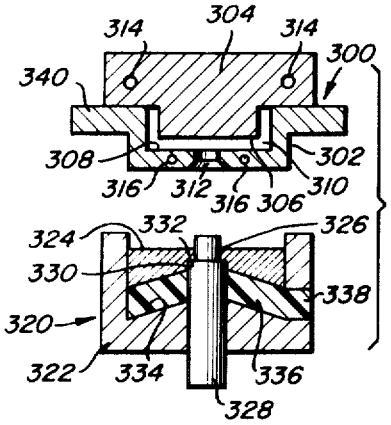
FIG. 15
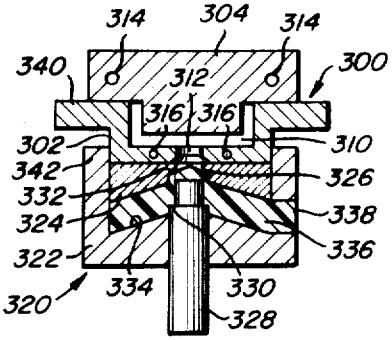
FIG. 16
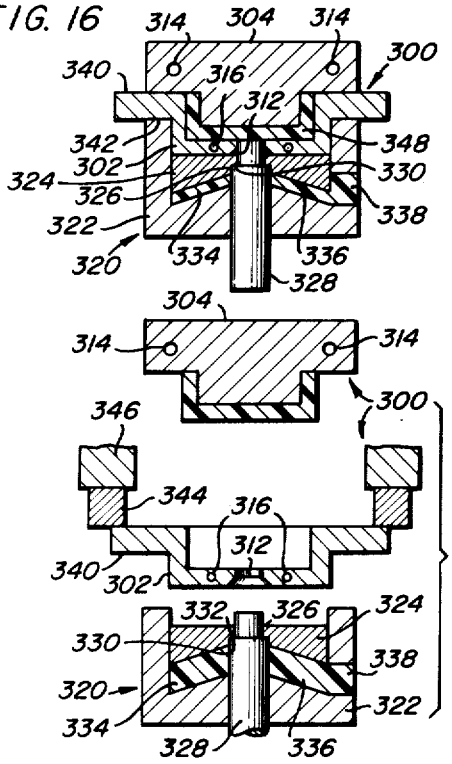
FIG. 17
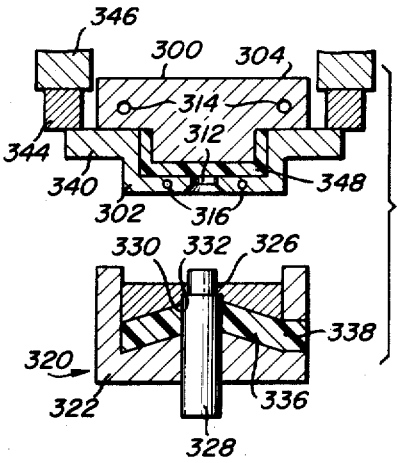
FIG. 18

United States Patent Office

Re. 28,158
Reissued Sept. 17, 1974

28,158

DISPLACEMENT MOLDING PLASTIC ARTICLES

Albert R. Uhlig, Toledo, Ohio, assignor to Owens-Illinois, Inc.

Original No. 3,685,941, dated Aug. 22, 1972, Ser. No. 48,653, May 15, 1970, which is a division of application Ser. No. 679,109, Oct. 30, 1967, now Patent No. 3,590,114. Application for reissue June 26, 1973, Ser. No. 373,827

Int. Cl. B29f *1/00*

U.S. Cl. 425—245 5 Claims

Matter enclosed in heavy brackets [ ] appears in the original patent but forms no part of this reissue specification; matter printed in italics indicates the additions made by reissue.

ABSTRACT OF THE DISCLOSURE

In accordance with the present invention, plasticized plastic material is confined within a chamber of variable volume, and part of the walls of the chamber are formed by a first mold part which is movable relative to the chamber. A gate opening in the first mold part is normally blocked by a movable blocking member. A second mold part is initially spaced from the first mold part and is moved into contact with the first mold part. There is a mold cavity in the mold parts. At the same time, the blocking member is moved out of the gate opening so that the mold cavity communicates with the plasticized material in the chamber. The first and second mold parts are then moved jointly to reduce the volume of the chamber and thereby inject plasticized material through the gate opening into the mold cavity. Next, the gate opening is closed by the blocking member. The mold parts and the blocking member are moved in the reverse direction to enlarge the chamber to its original volume, and then the first mold part and the blocking member are halted while the second mold part moves further in the reverse direction to its initial position to accommodate ejection of the molded article. In one embodiment, the second mold part includes two members defining the mold cavity, these members being separable to effect ejection of the molded article.

This application is a division of application Ser. No. 679,109, filed Oct. 30, 1967.

BACKGROUND OF THE INVENTION

This invention relates to a method of and apparatus for making plastic articles by injection molding, and more particularly to a method and apparatus whereby injection molding is accomplished by displacement of plasticized material into a mold cavity by movable mold parts.

Existing injection molding systems involve forcing molten plastic under high pressure into a cool mold cavity to be cured as fast as possible. It is well known that the cycle to produce an injection molded product is affected by injection speed, mold temperature and melt temperature. If these three factors are not well adjusted to each other, surface delamination will occur. While filling a mold, the incoming melt may stick to the wall of the mold cavity, and further filling proceeds through the core of the plastic on the wall of the cavity. If the temperature of the wall of the cavity is very low, or if filling speed is very slow, a pronounced boundary layer is formed which is no longer melted down or fused by the subsequently following material. It is recommended that the difference between temperature of melt and temperature of mold be as small as possible where the injection speed is relatively slow. If injection speed can be increased, the danger of layer build-up as explained above will be reduced.

Many modern injection molding machines utilize reciprocating extruders which make it possible to inject plasticized material into a mold cavtiy at high speed and under high pressure. This in turn calls for very high mold clamping forces, all of which complicates the machinery and makes it more expensive. It is also very difficult to maintain a certain injection pressure throughout the entire injection head system without creating too much of a pressure drop through channeling.

Another problem with modern fast injection molding machines involves the small filling gate used in such machines. When plastic melt is injected under high pressure through this small filling gate, friction produced by the melt passing through the gate produces heat which tends to degrade the plastic material.

SUMMARY OF THE INVENTION

It is now proposed to overcome the foregoing problems by utilizing a displacement molding principle in which movable molds displace plasticized material from a chamber into a mold cavity at very high filling speed. No expensive reciprocating extruder is needed because the displacement chamber can be filled with plasticized material under low pressure produced by an inexpensive extruder. A relatively large gate opening can be used to reduce frictionally induced heat.

The method and apparatus of the invention utilize a chamber of variable volume which is filled with plasticized material supplied from a conventional extruder, and movable mold parts which are moved relative to the chamber to reduce the volume of the chamber and thereby express plasticized material into a mold cavity formed by the mold parts. The invention utilizes the principles of a displacement molding method and apparatus described and claimed in U.S. Pat. No. 3,032,810 to L. D. Soubier and assigned to the present assignee. However, that patent involved injection, extrusion and blowing, and did not contemplate injection of plasticized material into a cavity formed by separable mold parts.

In a particular embodiment of the present invention, part of the walls of a displacement chamber are formed by one mold part which is movable relative to the chamber. A second movable mold part is spaced from the first mold part. The first mold part has a gate opening through which plasticized material may be injected into the mold cavity when it is formed, and this gate opening is initially closed by a blocking member which may also form a portion of the walls of the mold chamber. The second mold part is brought into contact with the first mold part, and at the same time the blocking member is moved out of the gate opening so that the mold cavity communciates with the plasticized material in the displacement chamber. The first and second mold parts are then moved jointly to reduce the volume of the displaceemnt chamber and thereby inject plasticized material through the gate opening into the mold cavity. After the injection step, the gate opening is closed by the blocking member. The mold parts and the blocking member are then moved in the reverse direction to return the displacement chamber to its original volume, and at this point the first mold part and the blocking member are halted. The displacement chamber starts to fill up with plasticized material supplied from the extruder, and the second mold part is moved further in the reverse direction to return it to its initial position spaced from the first mold part. The molded article is then ejected from the mold.

The method and apparatus of the invention have several advantages. The mold cavity is filled very quickly, thus eliminating the problems encountered with slow speed injection molding as explained above. This fast filling speed can be achieved inexpensively by the impact energy of a moving mold part. No expensive reciprocating extruder is required. A single forward and reverse stroke of the mold accomplishes in the correct sequence: (1) gate opening (2) clamping of mold parts, (3) high speed filling of cavities, (4) filling of displacement chamber, and (5) ejection of container.

The cost of a machine of the proposed type is reduced by the following factors: (a) an inexpensive extruder can be used, (b) the cost of hydraulic or mechanical equipment and control equipment for the single stroke motion of the parts is low compared to existing machines, (c) less tooling is required as compared to existing machines, (d) fast tooling change is possible, (e) low maintenance cost is obtained, and (f) low labor cost is obtained.

It is, therefore, an object of the present invention to provide an improved method and apparatus for injection molding of plastic articles by a displacement molding principle.

Another object of the invention is to provide a method wherein one stage of mold movement is used to form a mold cavity, and another stage of mold movement is utilized to displace plasticized material into the mold cavity.

A further object of the invention is to provide molding apparatus wherein first and second mold parts cooperate with a gate blocking member to fill a mold cavity by displacement of plasticized material with the molds, and to open and close a gate of the molds to allow such filling by a properly sequenced movement of the blocking member.

Another object of the invention is to fill a mold cavity by displacement molding employing a single forward and reverse stroke of a mold member which accomplishes (1) opening of a gate, (2) filling of a mold cavity by displacement molding, (3) re-closing of the gate, and (4) ejection of the molded article.

Other objects of this invention will appear in the following description and appended claims, reference being had to the accompanying drawings forming a part of this specification wherein like reference characters designate corresponding parts in the several views.

ON THE DRAWINGS

FIGS. 14 through 18 illustrate a further apparatus embodiment of the invention at various stages of a cycle and also illustrate method steps.

Before explaining the present invention in detail, it is to be understood that the invention is not limited in its application to the details of construction and arrangement of parts illustrated in the accompanying drawings, since the invention is capable of other embodiments and of being practiced or carried out in various way. Also, it is to be understood that the phraseology or terminology employed herein is for the purpose of description and not of limitation.

Figure 1:
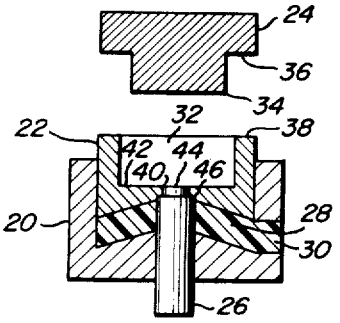
FIGS. 1 through 4 are a series of views schematically illustrating the displacement molding method and apparatus of the invention.

AS SHOWN ON THE DRAWINGS:

Referring first to FIGS. 1 through 4 inclusive, there is shown a base 20, a lower mold member 22, an upper mold member 24 and a blocking plunger 26 at various positions in a cycle of operation to illustrate the nature of the method and apparatus of the invention. In FIG. 1, the upper mold part 24 is in a raised initial position spaced from the lower mold part 22 which is mounted for vertical movement within the cup-shaped based 20. A displacement chamber 28 is formed between the bottom of the lower mold part 22 and the inside bottom wall of the base 20. The displacement chamber 28 communicates with a conventional plasticizing extruder through an opening 30 in the side wall of the base member 20, and plasticized material is supplied from the extruder through opening 30 to the displacement chamber 28 under relatively low pressure.

The lower mold part 22 is also cup-shaped and has a recess 32 therein which is adapted to receive a projecting male portion 34 of the upper mold part 24. Upper mold part 24 has a shoulder 36 which registers with and is adapted to engage the top rim 38 of the lower mold part 22.

There is a gate opening 40 through the bottom wall 42 of the lower mold part 22, and this opening is normally closed by the reduced tip 44 of the blocking plunger 26. Blocking plunger 26 has a shoulder 46 which seats on a registering surface of the lower mold part 22 when the blocking plunger 26 is in position to close the gate opening 40 as shown in FIG. 1.

With the various members of the apparatus in the positions shown in FIG. 1, the displacement chamber 28 is filled with plasticized material, and the gate opening 40 is closed by the plunger 26. The upper mold part 24 is in an initial position spaced above the lower mold part 22.

Figure 2:
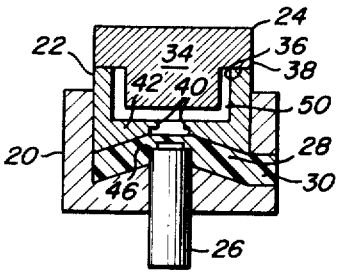

The first step of the method is to move the upper mold part 24 into contact with the lower mold part 22 so that the shoulder 36 of mold part 24 abuts the rim surface 38 of the lower mold part 22 as shown in FIG. 2. At the same time, the blocking plunger 26 is moved away from the gate opening 40 so that the mold cavity 50 formed between the upper and lower mold parts 24 and 22 communicates with the displacement chamber 28 through the gate opening 40. The movement of the blocking plunger 26 may be caused independently of the motion of the upper mold part 24, or alternatively, the upper mold part may be connected to the blocking plunger 26 so that the movement of the upper mold part forces the plunger 26 out of the gate opening.

Figure 3:
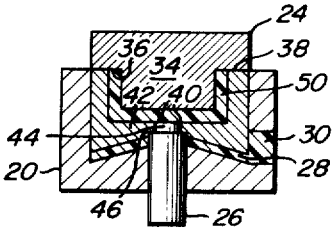

The next step is to move the upper mold part 24 and the lower mold part 22 jointly toward the body of plasticized material in the displacement chamber 28 so as to force plasticized material from the chamber through the gate opening 40 into the mold cavity 50. As shown in FIG. 3, this reduces the volume of the displacement chamber 28 and fills the mold cavity 50 with plasticized material. During the joint motion of the upper mold part 24 and the lower mold part 22, the gate opening 40 is again closed by the blocking plunger 26, also as shown in FIG. 3. The joint motion of the mold parts may continue until the lower mold part 22 seats on the shoulder 46 of the blocking plunger 26, or alternatively, the blocking plunger 26 may be moved in the reverse direction until it seats against the lower mold member 22. It may be noted that during the joint movement of the mold parts towards the displacement chamber 28, some excess plasticized material may be forced back through the opening 30 into the extruder.

Next, the two mold parts 24 and 22 and the blocking plunger 26 are moved in the reverse direction to return the lower mold part 22 to its initial position and to return the displacement chamber 28 to its original volume. The upper mold part 24 is moved in the reverse direction by a hydraulic cylinder or some other force applying means, and the lower mold part 22 is pushed back to its original position by the blocking plunger 26. The blocking plunger 26 may be urged in the reverse direction by spring pressure or by hydraulic pressure or a mechanical drive.

Figure 4:
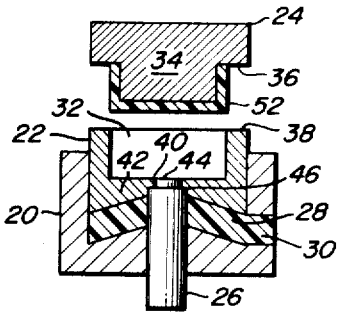

When the displacement chamber 28 reaches its original volume, the lower mold part 22 and the plunger 26 are halted. The upper mold part 24 continues to move in the reverse direction until it reaches its initial position spaced above the lower mold part 22 as shown in FIG. 4. The plastic article is carried by the upper mold part 24, and when the upper mold part reaches its initial position, the plastic article may be ejected therefrom by a suitable ejector mechanism (not shown). While the mold parts 22 and 24 are moving back to their initial positions, the displacement chamber 28 is filling up with plasticized material supplied from the extruder through opening 30. When the displacement chamber 28 is filled with plasticized material, the cycle is completed, and the apparatus is ready for the next molding cycle.

Figure 5:
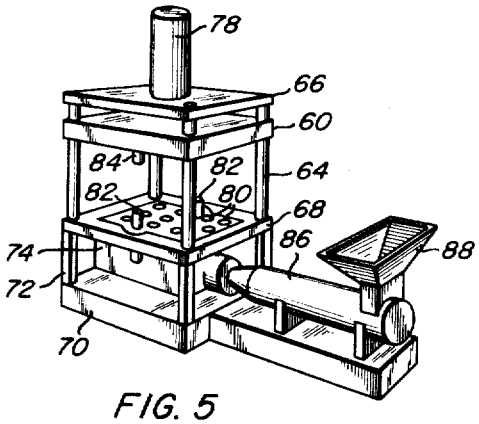
FIGS. 5 through 8 are a series of views showing one apparatus embodiment of the invention at various stages of a cycle and illustrating the method steps of the invention.

FIGS. 5 through 8 illustrate an embodiment of the invention in which a blocking plunger is moved in response to the motion of one of the mold parts. FIG. 5 shows the major parts of the apparatus of this embodiment. A movable platen 60 carries an upper mold part 62 (see FIG. 6), and platen 60 is movable vertically on stationary guide posts 64 attached to an upper frame member 66 and a lower frame member 68. The latter frame member is mounted above a base 70 on supports 72, and in the space between members 68 and 70 there is a multiple station compression head 74 which includes a lower mold part 76 (see FIG. 6). The movable platen 60 is raised and lowered by means of a hydraulic or pneumatic cylinder 78 mounted on frame member 66 with its piston connected to the platen 60.

Actually, several upper mold parts and several corresponding lower mold parts may be carried by the platen 60 and the compression head 74, and the lower mold parts are represented by circles 80 in FIG. 5. Pins 82 are provided in association with the compression head 74 for moving the blocking plunger associated with each lower mold part, and the pins 82 are actuated by other pins 84 carried by the movable platen 60.

Plasticized material is fed to displacement chambers in the compression head 74 from an extruder 86 which has a hopper 88 through which plastic material is fed into the extruder. Extruder 86 is mounted on the base 70.

Figure 6:
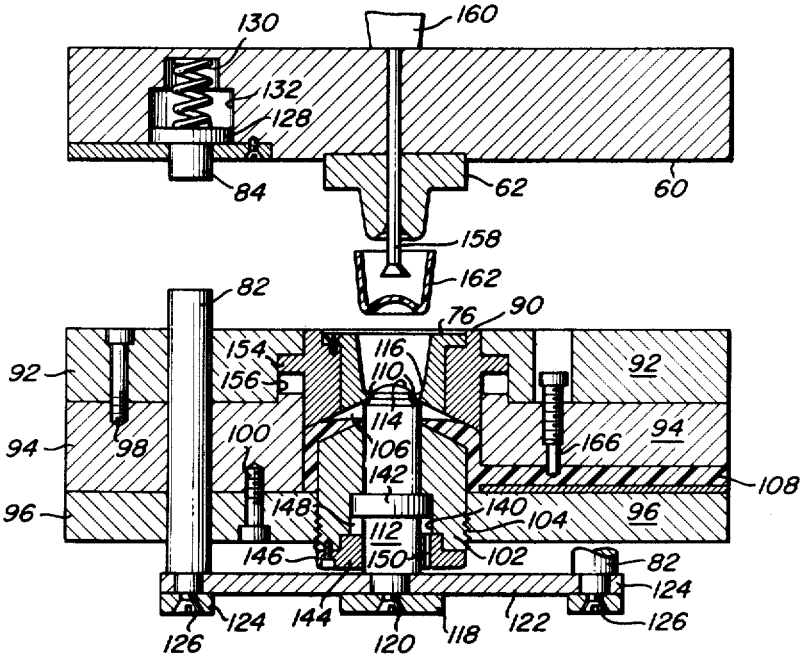

Referring to FIG. 6, an upper mold part 62 is shown mounted on platen 60 in a raised position above the lower mold part 76 which is attached to a movable structure 90. The stationary base of the apparatus includes three plates 92, 94 and 96, the upper plate 92 being attached to the intermediate plate 94 by screws 98, and the lower plate 96 being attached to the intermediate plate 94 by screws 100. A further stationary member 102 is threaded at 104 and screwed into matching threads on the lower plate 96 so that member 102 may be adjusted vertically relative to plate 96. A displacement chamber 106 is formed between lower mold part 76 and movable structure 90 on the upper side and stationary member 102 on the lower side. The displacement chamber 106 communicates with the extruder 86 through a passageway 108 provided between plates 94 and 96.

The lower mold part 76 has a gate opening 110 through its bottom wall which is normally closed by a blocking plunger 112, which has a reduced tip 114 fitting within the gate opening. Plunger 112 has a shoulder 116 which seats against the lower mold part 76. An enlarged head 118 is attached to plunger 112 by a screw 120, and head 118 clamps a plate 122 to the plunger. Plate 122 is connected to the pin 82 by means of head 124 and screw 126. Pin 82 extends through plates 92, 94 and 96 and is freely movable relative to the latter plates. The upper end of pin 82 is in alignment with the pin 84 carried by the platen 60. Pin 84 has a head 128 which is urged downwardly by a spring 130 provided in a recess 132 in platen 60.

Stationary member 102 has a counterbore surface 140 therein, and a radially enlarged head 142 on plunger 112 fits movably within this counterbore surface. A chamber 148 is formed within the stationary member 102. This chamber may be filled with oil or other hydraulic liquid supplied through an opening 150 which extends through the cap member 144. The opening 150 may be connected to an accumulator for storing oil under pressure which is not shown in the drawings. The plunger 112 is free to move within the vertical limits of the chamber 148, and it is urged upward to the position shown in FIG. 6 by the oil pressure within the chamber 148.

Movable structure 90 connected to lower mold part 76 is urged to an initial position by the plunger 112 as shown in FIG. 6. Movable structure 90 has a flange 154 thereon which fits in a recess 156 in plate member 92 as shown. Thus, movable structure 90 and lower mold part 76 are free to move within the limits of recess 156.

In connection with the movable platen 60, there is an ejector pin 158 which extends through upper mold part 62 and also through platen 60. With the platen 60 in the raised position shown in FIG. 6, the ejector pin 158 abuts against a fixed structure 160 which causes the ejector pin to project from the face of upper mold part 62. FIG. 6 shows an articale 162 being ejected from the upper mold part 62 by the ejector pin 158. A suitable spring (not shown) may be provided for urging ejector pin 158 to a retracted position.

FIG. 6 also shows the displacement chamber 106 being filled with plasticized material supplied through passageway 108 from the extruder 86. When the displacement chamber 106 is filled with plasticized material the apparatus is ready to begin a new cycle of operation. It may be noted that the flow of plasticized material through the passageway 108 is controlled by a control member 166 which projects into the passageway 108. Control member 166 may be adjusted vertically to control the cross-sectional size of the passageway 108 to thereby control the rate of filling the displacement chamber 106, and also to restrict the flow of plasticized material in the reverse direction through passageway 108 when the displacement chamber 106 is reduced in volume in the operation of the apparatus. Reverse flow over flow control 166 creates back pressure which increases the injection pressure and thus increases the density of the molded article 162. Less back pressure would fill the mold cavity only loosely.

Figure 7:
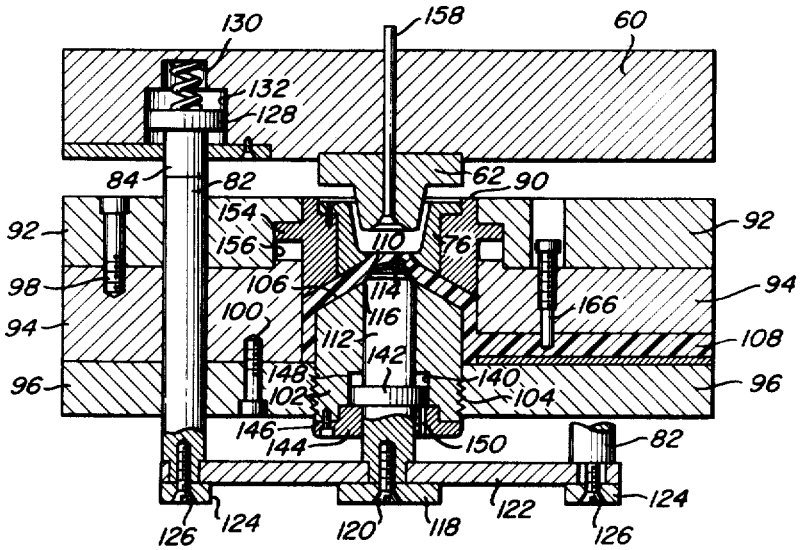
Figure 8:
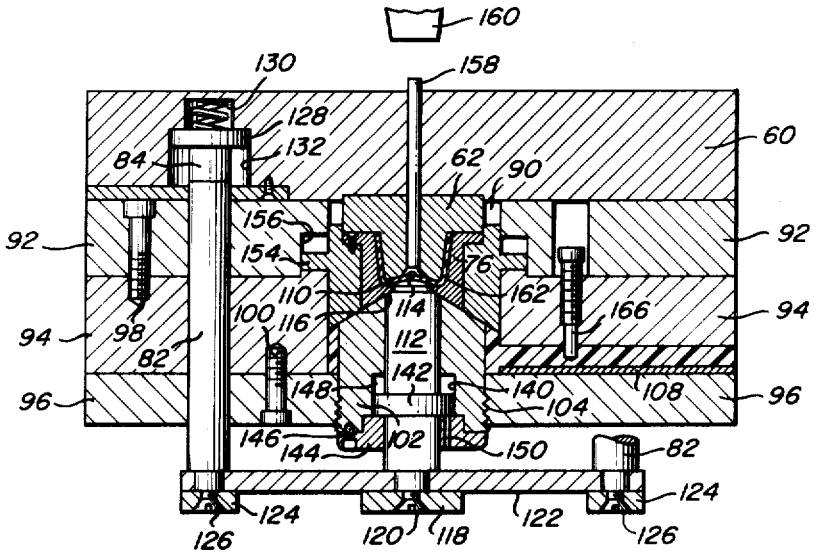

It will be understood that the method of the invention is carried out by the apparatus of FIGS. 6 through 8. In the first step of the method, the upper mold part 62 and the platen 60 are moved toward the lower mold part 76. During this movement, the pin 84 carried by platen 60 contacts the pin 82 carried by plates 92, 94 and 96 and forces pin 82 downwardly, thus retracting blocking plunger 112 out of the gate opening 110 in the lower mold part 76. As shown in FIG. 7, the blocking plunger 112 moves downward until the enlarged head 142 abuts against end cap 144. As the platen 60 and upper mold part 62 continue moving downward, the pin 84 compresses spring 130 and thus allows relative movement of the platen 60 to continue.

As the platen 60 moves downward further, the upper mold part 62 contacts the lower mold part 76 and then begins to push the lower mold part 76 and movable structure 90 downward so that the two mold parts move jointly toward the displacement chamber 106. During this movement the flange 154 on movable structure 90 rides downward through the recess 156 until it abuts against intermediate plate 94. The latter condition of the apparatus is shown in FIG. 8.

In the condition of the apparatus shown in FIG. 8, the displacement chamber 106 has been reduced in volume, thus forcing plasticized material through the gate opening 110 into the mold cavity formed between the two mold parts and the blocking plunger. Some plasticized material also flows back through passage 108 into the extruder. The lower mold part 76 has at this stage seated on the shoulder 116 of the plunger 112 such that the gate opening 110 is again closed.

Next, the cylinder 78 (FIG. 5) starts to withdraw the platen 60 in the reverse direction so that the upper mold part 62 moves in the reverse direction. The oil pressure applied to enlarge head 142 through the opening 150 forces the plunger 112 to follow the upper mold part, and the plunger in turn pushes the lower mold part 76 along with the upper mold part until the lower mold part returns to its initial position as shown in FIG. 6. At this point, the flange 154 abuts against plate member 92 so that lower mold part 76 cannot move any farther. The blocking plunger 112 is also halted with the enlarged head 142 abutting against the upper end of the chamber 148.

The platen 60 and the upper mold part 62 continue to move in the upward direction until they reach their initial position as shown in FIG. 6. The molded article is carried on the upper mold part 62, and as the platen 60 approaches its initial position, the ejector pin 158 hits stationary structure 160 and further movement of the platen causes the upper mold part 62 to withdraw from the plastic article so that the article is ejected as shown in FIG. 6.

Figure 9:
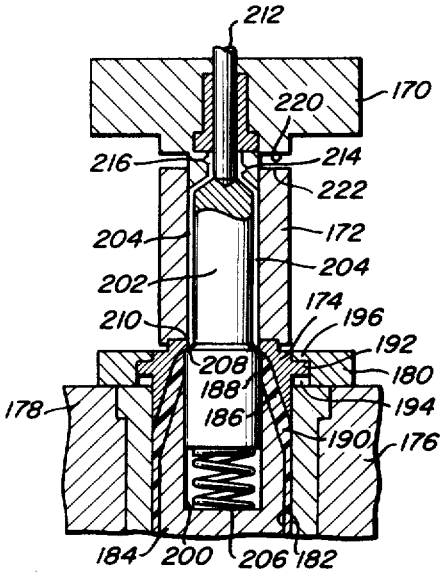
FIGS. 9 through 12 illustrate another apparatus embodiment of the invention at various stages of a cycle and also illustrate method steps.
Figure 10:
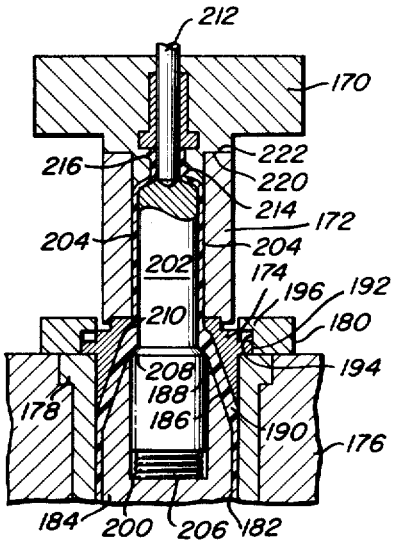

FIGS. 9 through 12 show another embodiment of the invention which is adapted for the molding of squeeze tubes. FIG. 9 shows the apparatus in a condition where an upper mold part 170 is moving downward towards a lower mold part which is made of two pieces 172 and 174. The lower mold part 172, 174 is movable vertically within a base which is made up of members 176, 178 and 180. Base portion 178 is an annular sleeve which has a bore surface 182 wherein a stationary structure 184 is provided. There is a space between the outer perimeter of stationary structure 184 and the bore surface 182, and plasticized material is supplied through this space from an extruder which is not shown. The lower mold part 172, 174 is movable vertically within the bore surface 182 of the base portion 178. A displacement chamber 186 is formed between an inner surface 188 of member 174 and the end surface 190 of the stationary structure 184. Piece 174 of the lower mold part has a flange 192 which fits in a recessed surface 194 of base member 180. Another flange 196 of member 180 overlies the flange 192 of member 174 and forms a stop for holding the lower mold part in its upper position.

The stationary structure 184 has a central recess 200 therein which the blocking plunger 202 is received. The blocking plunger 202 extends upwardly up through the lower mold part 172, 174 and provides one of the wall surfaces of a cavity 204 in which a squeeze tube is to be molded.

The blocking plunger 202 is urged to an upper position by a spring 206, and in this upper position a shoulder 208 on the plunger abuts against a corresponding shoulder 210 on portion 174 of the lower mold part. The shoulder 210 defines a gate opening through which plasticized material may be injected from the displacement chamber 186 to the mold cavity 204. With the plunger 202 in its upper position as shown in FIG. 9, the gate opening 210 is closed by blocking plunger.

Upper mold part 170 carries a core pin 212 which projects from the lower end of the upper mold part 170. Annular surface 214 of upper mold part 170 is threaded, and an annular space 216 is formed between the core pin 212 and the threaded surface 214. The neck of the squeeze tube is formed in this annular space 216.

In the condition of the apparatus as shown in FIG. 9, the core pin 212 has just made contact with the upper end of the blocking plunger 202. Thus, the upper mold part 170 is shown as it is moving down toward the lower mold part 172, 174. As the upper mold part 170 continues to move downward, the blocking plunger 202 is also moved downward relative to the shoulder 210 of the portion 174 of the lower mold part, and this opens the gate opening at shoulder 210 so that the mold cavity 204 communicates with the displacement chamber 186. The upper mold part 70 reaches a position where its surface 220 abuts against the upper surface 222 of portion 172 of the lower mold part. Further downward movement of upper mold part 170 causes the lower mold part 172, 174 to also move downwardly, thus reducing the volume of the displacement chamber 186 and forcing plasticized material into the cavity 204. The upper mold part and the lower mold part continue moving jointly downwardly until the flange 192 on lower mold part 174 abuts against the top of the stationary base portion 178. The apparatus is shown in this condition in FIG. 10.

Next, the upper mold part 1 is retracted in the reverse direction, and the pressure exerted on blocking plunger 202 by the spring 206 causes the blocking plunger to follow the upper part 170. The plunger 202 in its upward movement engages the shoulder 210 of portion 174 of the lower mold part and from this point on pushes the lower mold portion 174 along with it until the flange 192 abuts against the overlying flange 196 of base portion 180. At this point, the upward motion of lower mold part 172, 174 and blocking plunger 202 is halted.

Figure 11:
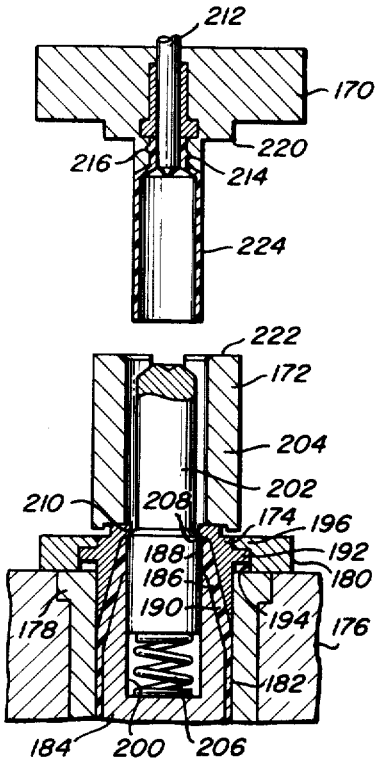

The upper mold part 170 continues to move upward and carries a finished squeeze tube 224 along with it until the squeeze tube is clear of the lower mold part. The tube is physically separated when shoulder 210 abuts against the other shoulder 208. This condition of the apparatus is shown in FIG. 11.

Figure 12:
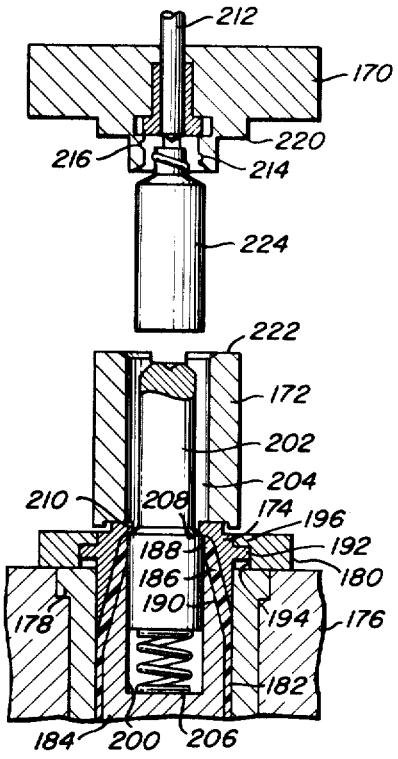

As shown in FIG. 12, the upper mold part 170 is provided with two halves which are then separated laterally to release the squeeze tube 224 and thus ejects the squeeze tube from the mold.

As the upper mold part is moving upwards, the displacement chamber 186 is filling with plasticized material supplied through passageway 182 from an extruder (not shown). Thus, when the finished article 224 has been ejected, the apparatus is ready to begin a new cycle of operation.

Figure 13:
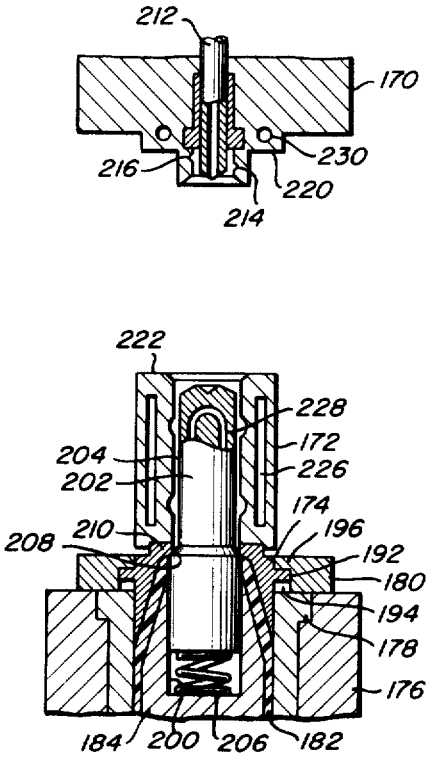
FIG. 13 illustrates a modification of the embodiment of FIGS. 9 through 12.

As shown in FIG. 13, heaters 226 and 228 may be provided in members 172 and 202 to heat the mold cavity 204, and a coolant passage 230 may be provided in mold part 170 to cool the neck space 216. Thus, the upper mold part may be kept cool to facilitate rapid cooling of the neck of the article while permitting cavity 204 to be maintained at optimum temperature for molding.

Another embodiment of the invention in which cooling of a mold may be utilized is illustrated in FIGS. 14–18. In this embodiment, an upper mold 300 is formed by a cup-shaped mold member 302 and another mold member 302 having a projection 306 adapted to enter the recess 308 in member 302 to form a mold cavity 310. A gate opening 312 is provided in cup-shaped member 302 to allow communication between the mold cavity 310 and a displacement chamber as will be described. The entire upper mold 300 is movable in the vertical direction, and mold members 302 and 304 are separable.

Mold member 304 has a passageway including openings 314 through which water or some other cooling liquid may be circulated to keep the mold member cool. Mold member 302 also has a passageway including openings 116 through which water or other cooling liquid may be circulated to keep the mold member cool.

Below mold 300 is provided an injection head 302 including a cup-like base 322 in which vertically movable lower mold member 324 is provided. Mold member 324 has a gate opening at 326 extending through the same, and this opening is normally closed by a blocking member 328 which has a shoulder at 330 abutting against a lip 332 of mold member 324. The blocking member 328 holds lower mold member 324 in spaced relation with the bottom 334 of base 322 to form a displacement chamber 336, and this displacement chamber communicates with a source of plasticized material through an opening 338 in the side wall of base member 322.

Initially, the displacement chamber 336 is filled with plasticized material which has been supplied from the source thereof. In FIG. 14, the mold assembly 300 is shown with mold members 302 and 304 in contact with each other to form the mold cavity 310, and mold 300 is in a raised position over the injection head 320. It will be understood, however, that mold member 304 may initially be spaced above mold member 302 and then brought down into contact with mold member 302 to form the mold cavity 310.

Mold 300 is then lowered toward injection head 320 to bring mold member 302 into contact with the lower mold member 324 which is a part of the injection head, and to align gate opening 312 with gate opening 326. Then the blocking plunger 328 is lowered to move the tip of the blocking plunger out of gate opening 326 so that the mold cavity 310 communicates with the displacement chamber 336 through gate openings 312 and 326. The condition of the apparatus at this stage is shown in FIG. 15.

Mold members 302, 304 and 324 are then lowered further towards the displacement chamber 336 to force plasticized material from the displacement chamber through gate openings 312 and 326 into the mold cavity 310 as the volume of the displacement chamber 336 is reduced. The mold members may be lowered until lip 340 of mold member 302 abuts against the top edge 342 of base 322 in the manner shown in FIG. 16. At this stage displacement chamber 336 has been reduced to its minimum volume, and gate openings 326 and 312 have slipped over the tip end of blocking plunger 328 so that the gate openings are again closed by the blocking member.

Mold members 302, 304 and 324 are then raised jointly to return the displacement chamber to its original volume, and at this point mold member 324 is halted. During this motion, mold member 324 may be raised by the blocking plunger 328, whereas mold members 302 and 304 are raised by a head (not shown) to which they are connected.

Mold members 302 and 304, still in contact with each other, are then raised further away from mold member 324 until the lip 340 of mold member 302 contacts an abutment 344 mounted in a stationary position on a support 346. The apparatus at this stage of the process is illustrated in FIG. 17. It may be seen that a plastic article 348 has been formed in the mold cavity 310. Mold members 302 and 304 are in raised position above injection head 320, and the motion of mold member 302 has been halted by the abutment 344. Displacement chamber 336 is at its original volume and is again being filled with plasticized material supplied from the source thereof through opening 338.

Mold member 304 is then raised further to separate it from cup-shaped mold member 302 to the position shown in FIG. 18. The plastic article 348 is carried by mold member 304, and at this stage the plastic article 348 may be ejected from mold member 304 by any suitable means such as an ejector plunger of the type used in the previous embodiments.

One important feature of the embodiment of FIGS. 14–18 is that the mold members 302 and 304 which form the mold cavity 310 may be kept cool by the liquid circulated through passageways 314 and 316 to facilitate rapid cooling of the plastic article 348 after it has been formed. The injection head 320 including the mold part 324 may be kept hot by the plasticized material, perhaps supplemented by heating means if desired, to maintain the displacement chamber at an optimum temperature for molding. This affords a reduction in the cycle time as compared for example in the embodiment of FIGS. 1–4 where one entire mold half is part of the hot injection head.

Although the present invention has been described in connection with the molding of plasticized plastic material, the method and apparatus obviously could be utilized with any material capable of being molded.

Having thus, described my invention, I claim:

1. In an apparatus for making a plastic object, means including a first movable mold part defining a chamber of variable volume for containing a body of plasticized material, means for supplying plasticized material to said chamber, a second movable mold part having an initial position spaced from said first mold part, means for moving said second mold part in two stages toward said body of material (1) to bring said second mold part into contact with said first mold part with said mold parts defining a mold cavity, and (2) to move said first and second mold parts jointly in a first direction to reduce the volume of said chamber and thereby force plasticized material into said mold cavity, and means for moving said second mold part in the reverse of said first direction in two stages (1) to return said first and second mold parts to positions wherein said camber is at the original volume thereof, and (2) to subsequently return said second mold part to said initial position thereof, movable flow control means carried by said *chamber defining means, said control means blocking flow* [first mold part and normally interposed] between said chamber and said mold cavity *prior to joint movement first direction* [when said mold parts are in contact], and means for moving said flow control means to *provide fluid communication between* [interconnect] said chamber and said cavity [only during joint movement of] *when* said mold parts *are being jointly moved* in said first direction.

2. In an apparatus for making a plastic object by injection of plasticized material into an injection mold, means including a first movable mold part defining a chamber of variable volume for containing a body of plasticized material, said first mold part having a gate opening therein through which material may be injected from said body into a cavity formed partly by said first mold part, a movable blocking means normally closing said gate opening, means for supplying plasticized material to said chamber, a second movable mold part having an initial position spaced from said first mold part, means movable with said second mold part engageable with said blocking means to move said blocking means away from said gate opening to thereby open said gate opening, means for moving said second mold part in two stages towards said body of material (1) to bring said second mold part into contact with said first mold part to thereby form a mold cavity and to move said blocking means away from said gate opening so that said mold cavity communicates with said body of material through said gate opening, and (2) to move said first and second mold parts jointly in a first direction to reduce the volume of said chamber and thereby force plasticized material through said gate opening into said mold cavity and ultimately to close said gate opening with said blocking means, and means for moving said second mold part in the reverse of said first direction in two stages (1) to return said first and second mold parts and said blocking means to positions wherein said chamber is at the original volume thereof, and (2) to subsequently return said second mold part to said initial position thereof.

3. The apparatus for making plastic objects as claimed in claim 2 and further including ejection means with said second mold part actuated upon return of said second mold part to said initial position thereof to eject said object from said second mold part.

4. The apparatus for making plastic objects as claimed in claim 2 in which said blocking means has a portion defining part of the walls of said chamber.

*5. In an apparatus for making a plastic object, means including a first movable mold part defining a chamber of variable volume for containing a body of plasticized material, means for supplying plasticized material to said chamber, a second movable mold part having an initial position spaced from said first mold part, means for imparting relative movement to said mold parts in two stages (1) to bring said second mold part into contact with said first mold part with said mold parts defining a mold cavity, and (2) to move said first and second mold parts jointly in a first direction to reduce the volume of said chamber and thereby force plasticized material into said mold cavity, and means for moving said second mold part in the reverse of said first direction in two stages (1) to return said first and second mold parts to positions wherein said chamber is at the original volume thereof, and (2) to subsequently return said mold parts to their initial relative positions, movable flow control means carried by said chamber defining means, said control means blocking flow between said chamber and said mold cavity prior to joint movement of said mold parts in said first direction, and means for moving said flow control means*

*to provide fluid communication between said chamber and said cavity when said mold parts are being jointly moved in said first direction.*

References Cited

The following references, cited by the Examiner, are of record in the patented file of this patent or the original patent.

UNITED STATES PATENTS

| | | | |
|---|---|---|---|
| 3,071,814 | 1/1963 | Guggenheim | 425—Dig. 228 |
| 3,196,485 | 7/1965 | Battenfeld | 425—247 |
| 3,550,210 | 12/1970 | Barr | 425—245 |
| 2,848,743 | 8/1958 | Mercier | 425—Dig. 228 |
| 3,488,810 | 1/1970 | Gellert | 425—245 |

FOREIGN PATENTS

| | | |
|---|---|---|
| 8,322/61 | 6/1961 | Japan. |

ROBERT D. BALDWIN, Primary Examiner

D. B. SMITH, Assistant Examiner

U.S. Cl. X.R.

425—252, 351, 354